(12) United States Patent
Ota et al.

(10) Patent No.: US 12,428,545 B2
(45) Date of Patent: Sep. 30, 2025

(54) RESIN COMPOSITION

(71) Applicant: Plantic Technologies Ltd., Altona (AU)

(72) Inventors: Masahiko Ota, Kurashiki (JP); Akihiro Kotaka, Kurashiki (JP); Tsuyoshi Katakura, Tokyo (JP)

(73) Assignee: Plantic Technologies Ltd., Altona (AU)

( * ) Notice: Subject to any disclaimer, the term of this patent is extended or adjusted under 35 U.S.C. 154(b) by 534 days.

(21) Appl. No.: 17/922,116

(22) PCT Filed: Apr. 28, 2021

(86) PCT No.: PCT/IB2021/053494
§ 371 (c)(1),
(2) Date: Oct. 28, 2022

(87) PCT Pub. No.: WO2021/220172
PCT Pub. Date: Nov. 4, 2021

(65) Prior Publication Data
US 2023/0167277 A1 Jun. 1, 2023

(30) Foreign Application Priority Data

Apr. 30, 2020 (JP) ................................. 2020-080633

(51) Int. Cl.
*C08L 3/08* (2006.01)
*B29C 48/00* (2019.01)
*B29C 48/40* (2019.01)
*B29K 29/00* (2006.01)
*B29L 9/00* (2006.01)
*B29L 31/00* (2006.01)
*C08L 29/04* (2006.01)

(52) U.S. Cl.
CPC .............. *C08L 3/08* (2013.01); *B29C 48/022* (2019.02); *B29C 48/40* (2019.02); *C08L 29/04* (2013.01); *B29K 2003/00* (2013.01); *B29K 2029/04* (2013.01); *B29K 2995/006* (2013.01); *B29K 2995/0067* (2013.01); *B29L 2009/00* (2013.01); *B29L 2031/7128* (2013.01); *C08L 2201/06* (2013.01); *C08L 2201/14* (2013.01); *C08L 2203/162* (2013.01)

(58) Field of Classification Search
CPC ........... B29C 48/0017; B29C 48/0022; B29C 48/022; B29C 48/04; B29C 48/05; B29C 48/08; B29C 48/154; B29C 48/21; B29C 48/28; B29C 48/40; B29C 48/405; B29C 48/41; B29C 48/92; B29C 51/002; B32B 21/06; B32B 21/08; B32B 27/08; B32B 27/10; B32B 27/285; B32B 27/304; B32B 27/306; B32B 27/308; B32B 27/32; B32B 27/34; B32B 27/36; B32B 27/40; B32B 2250/03; B32B 2250/24; B32B 2250/40; B32B 2255/10; B32B 2255/12; B32B 2255/26; C08L 29/04; C08L 2203/30; C08L 2203/025; C09D 103/04; C09D 103/08

See application file for complete search history.

(56) References Cited

U.S. PATENT DOCUMENTS

| | | | |
|---|---|---|---|
| 5,032,337 A | 7/1991 | Nachtergaele et al. | |
| 6,569,539 B2 | 5/2003 | Bentmar et al. | |
| 2008/0182113 A1 | 7/2008 | Hausmann et al. | |
| 2014/0349047 A1 | 11/2014 | McCaffrey et al. | |
| 2015/0210461 A1 | 7/2015 | Morris et al. | |
| 2020/0339785 A1* | 10/2020 | Ota ........................... | C08J 3/12 |

FOREIGN PATENT DOCUMENTS

| | | |
|---|---|---|
| AU | 2012-318251 A1 | 7/2013 |
| AU | 2018-292709 A1 | 1/2020 |
| AU | 2019-412826 A | 7/2021 |
| JP | H6-508866 A | 10/1994 |
| JP | 2019-006900 A | 1/2019 |
| WO | 92/16583 A1 | 10/1992 |
| WO | 2020/136598 A1 | 7/2020 |
| WO | 2021/070096 A1 | 4/2021 |

OTHER PUBLICATIONS

International Search Report issued in corresponding International Patent Application No. PCT/IB2021/053494 dated Aug. 19, 2021.
International Preliminary Report on Patentability and Written Opinion issued in corresponding International Patent Application No. PCT/IB2021/053494 dated Oct. 27, 2022.

* cited by examiner

Primary Examiner — Christopher M Rodd
(74) Attorney, Agent, or Firm — Morgan, Lewis & Bockius LLP

(57) ABSTRACT

The resin composition of the present invention comprises 40 to 98 parts by mass of a modified starch (A), 2 to 60 parts by mass of a polyvinyl alcohol (B) having a degree of saponification of 75.0 mol % or more, and optionally a clay (C), wherein the total content of the (A), (B) and (C) is 100 parts by mass, and the peak temperature of tan δ in measurement of dynamic viscoelasticity in a range of 20° C. to 150° C. is 128° C. or lower.

16 Claims, 4 Drawing Sheets

RESIN COMPOSITION

TECHNICAL FIELD

The present invention relates to a resin composition to be used for food packaging, etc., a hydrous composition comprising the resin composition, a coated product comprising the hydrous composition and a method for producing the same, a multilayer structure comprising the coated product, a bonded body comprising the coated product or the multilayer structure, and a packaging material comprising the bonded body.

BACKGROUND ART

Heretofore, resin compositions comprising modified starch and water-soluble polymer have been widely used for containers for packaging foods because such resin compositions are superior in biodegradability and gas barrier property (for example, Patent Document 1). However, when a container or the like is formed using such a resin composition, it is necessary to use an adhesive material such as a hot melt adhesive, and thus an increased cost is required and the biodegradability is deteriorated. For this reason, the resin composition is required to have heat sealability so that the resin composition can be bonded even without an adhesive material.

PRIOR ART DOCUMENTS

Patent Documents

Patent Document 1: JP-A-2019-6900

SUMMARY OF THE INVENTION

Problems to be Solved by the Invention

However, according to the study of the present inventor, it was found that the resin composition as in Patent Document 1 has a relatively high gas barrier property, but does not have a sufficient heat sealability. In addition, it was also found that an attempt to improve the heat sealability may deteriorate the gas barrier property and it is difficult to achieve both heat sealability and gas barrier property.

Thus, an object of the present invention is to provide a resin composition superior in heat sealability and gas barrier property, a hydrous composition comprising the resin composition, a coated product comprising the hydrous composition and a method for producing the same, a multilayer structure comprising the coated material, a bonded body comprising the coated material or the multilayer structure, and a packaging material comprising the bonded body.

Means for Solving Problems

As a result of diligent studies for solving the above-described problems, the present inventor has found that the problems can be solved by, in a resin composition comprising 40 to 98 parts by mass of a modified starch (A), 2 to 60 parts by mass of a polyvinyl alcohol (B) having a degree of saponification of 75.0 mol % or more, and optionally a clay (C), adjusting a peak temperature of tan δ in measurement of dynamic viscoelasticity in a range of 20° C. to 150° C. to 128° C. or lower, and have accomplished the present invention. That is, the present invention includes the following embodiments.

[1] A resin composition comprising 40 to 98 parts by mass of a modified starch (A), 2 to 60 parts by mass of a polyvinyl alcohol (B) having a degree of saponification of 75.0 mol % or more, and optionally a clay (C), wherein the total content of the (A), (B) and (C) is 100 parts by mass, and the peak temperature of tan δ in measurement of dynamic viscoelasticity in a range of 20° C. to 150° C. is 128° C. or lower.

[2] The resin composition according to [1], wherein the total content of the modified starch (A), the polyvinyl alcohol (B), and the clay (C) is 80 mass % or more with respect to the mass of the resin composition.

[3] The resin composition according to [1] or [2], wherein the modified starch (A) has an average amylose content of 45% by mass or more.

[4] The resin composition according to any one of [1] through [3], wherein the polyvinyl alcohol (B) has a degree of saponification of 75.0 to 98.9 mol %.

[5] The resin composition according to any one of [1] through [4], wherein the content of the clay (C) is 0 parts by mass or more and less than 2 parts by mass.

[6] The resin composition according to any one of [1] through [5], wherein the modified starch (A) is at least one selected from the group consisting of an etherified starch, an esterified starch, a cationized starch, and a crosslinked starch.

[7] The resin composition according to any one of [1] through [6], wherein the modified starch (A) is at least one selected from the group consisting of an etherified starch having a hydroxyalkyl group having 2 to 6 carbon atoms and an esterified starch having a structural unit derived from a dicarboxylic anhydride.

[8] The resin composition according to any one of [1] through [7], wherein a 4% aqueous solution of the polyvinyl alcohol (B) has a viscosity at 20° C. measured in accordance with JIS Z 8803 of 1 to 50 mPa·s.

[9] A hydrous composition comprising the resin composition according to any one of [1] through [8], wherein the hydrous composition has a water content of 1 to 50% by mass.

[10] A coated product in which a paper or a film is coated with the hydrous composition according to [9].

[11] A multilayer structure comprising the coated product according to [10] and one or more layers (X).

[12] A bonded body in which the hydrous composition of the coated product according to [10] or the multilayer structure according to [11] and an adhered layer are thermally bonded together, wherein the adhered layer is a layer selected from the group consisting of the hydrous composition, the paper, the film, and the layer (X) contained in the coated product, the multilayer structure, another coated product, or another multilayer structure, or a layer contained in an adhered body other than these.

[13] The bonded body according to [12], wherein the adhered layer is the hydrous composition contained in the coated product, the multilayer structure, another coated product, or another multilayer structure.

[14] A packaging material comprising the bonded body according to [12] or [13].

[15] The packaging material according to [14], which is a two-side-sealed bag, a three-side-sealed bag, a flat pouch, a standing pouch, a gusset pouch, a twin pouch, or a spout pouch.

[16] A method for producing the coated product according to [10], comprising a step of coating a film or a paper conveyed by a winding device with the hydrous composition according to [9] by using an extruder.

Effects of the Invention

The resin composition of the present invention is superior in heat sealability and gas barrier property.

EMBODIMENTS OF THE INVENTION

[Resin Composition]

Figure 1:
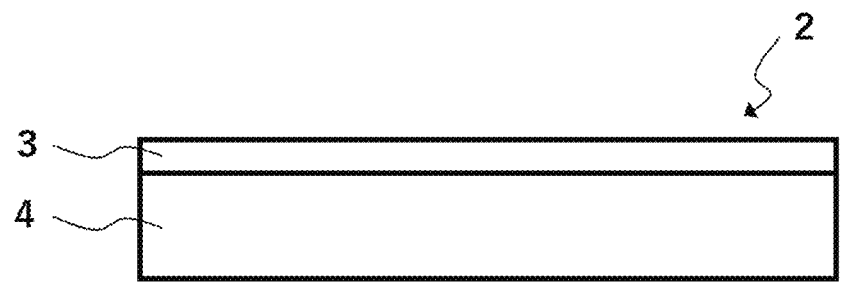
FIG. 1 is a schematic cross-sectional view showing a layer configuration of a coated product in one embodiment of the present invention.

The resin composition of the present invention comprises 40 to 98 parts by mass of a modified starch (A), 2 to 60 parts by mass of a polyvinyl alcohol (B) having a degree of saponification of 75.0 mol % or more, and optionally a clay (C), wherein the peak temperature of tan δ in measurement of dynamic viscoelasticity in a range of 20° C. to 150° C. is 128° C. or lower.

The present inventors have unexpectedly found that when a modified starch (A) and a polyvinyl alcohol (B) having a degree of saponification of 75.0 mol % or more are contained in a specific ratio, and the peak temperature of tan δ is 128° C. or lower, both a superior heat sealability and a superior gas barrier property can be achieved.

<Modified Starch (A)>

The modified starch (A) is preferably at least one selected from the group consisting of an etherified starch, an esterified starch, a cationized starch, and a crosslinked starch from the viewpoint of being easy to enhance the heat sealability, the gas barrier property, and the biodegradability.

Examples of the starch include starches derived from cassava, corn, potato, sweet potato, sago, tapioca, sorghum, bean, bracken, lotus, Trapa japonica, wheat, rice, oat, arrowroot, and pea. Inter alia, starch derived from corn or cassava is preferable, and starch derived from high amylose corn is further preferable. Starch may be used singly, or two or more kinds of starch may be used in combination.

Examples of the etherified starch include alkyl etherified starches, such as methyl etherified starch; carboxyalkyl etherified starches, such as carboxymethyl etherified starch; and hydroxyalkyl etherified starches, such as etherified starch having a hydroxyalkyl group having 2 to 6 carbon atoms. Alternatively, allyl etherified starches and the like can also be used.

Examples of the esterified starch include esterified starches having a structural unit derived from carboxylic acid, such as esterified starch having a structural unit derived from acetic acid; esterified starches having a structural unit derived from a dicarboxylic anhydride, such as esterified starch having a structural unit derived from maleic anhy-dride, esterified starch having a structural unit derived from phthalic anhydride, and esterified starch having a structural unit derived from octenylsuccinic anhydride; and esterified starches having a structural unit derived from oxo acid, such as nitric acid esterified starch, phosphoric acid esterified starch, and urea-phosphoric acid esterified starch. Other examples thereof include xanthogenic acid esterified starch and acetoacetic acid esterified starch.

Examples of the cationized starch include a reaction product of starch and 2-diethylaminoethyl chloride and a reaction product of starch and 2,3-epoxypropyltrimethylammonium chloride.

Examples of the crosslinked starch include formaldehyde-crosslinked starch, epichlorohydrin-crosslinked starch, phosphoric acid-crosslinked starch, and acrolein-crosslinked starch.

From the viewpoint of being easy to enhance the heat sealability, the gas barrier property, and the biodegradability, the modified starch (A) is preferably at least one selected from the group consisting of an etherified starch having a hydroxyalkyl group having 2 to 6 carbon atoms and an esterified starch having a structural unit derived from a dicarboxylic anhydride, and is more preferably at least one selected from the group consisting of hydroxyethyl etherified starch, hydroxypropyl etherified starch, hydroxybutyl etherified starch, an esterified starch having a structural unit derived from maleic anhydride, an esterified starch having a structural unit derived from phthalic anhydride, and an esterified starch having a structural unit derived from octenylsuccinic anhydride. The modified starch (A) may be used singly, or two or more species thereof may be used in combination. In the present description, the number of carbon atoms prefixed to "starch" indicates the number of carbon atoms of a group that has substituted for one hydroxyl group in the starch (a group formed by modifying one hydroxyl group in the starch). For example, an etherified starch having a hydroxyalkyl group having 2 to 5 carbon atoms indicates that the number of carbon atoms of the hydroxyalkyl group formed by modifying one hydroxyl group in the starch is 2 to 5.

The etherified starch having a hydroxyalkyl group having 2 to 6 carbon atoms may be an etherified starch obtained by a reaction between alkylene oxide such as ethylene oxide, propylene oxide, or butylene oxide, and starch. The average number of hydroxy groups to be used in modification is preferably 0.05 to 2 per one glucose unit in the starch.

In the modified starch (A), the average amylose content of the modified starch (A) is preferably 45% by mass or more, more preferably 50% by mass or more, even more preferably 55% by mass or more, and further preferably 60% by mass or more. When the average amylose content is equal to or greater than the aforementioned lower limit, the heat sealability, the gas barrier property, and the biodegradability tend to be enhanced. The average amylose content in the modified starch (A) is usually 90% by mass or less. In the present description, the amylose content can be measured by, for example, the colorimetric iodine method described in "Starch Vol. 50, No. 4, 158-163 (1998)." When the modified starch contains only a single kind of modified starch, the average amylose content means the amylose content of the single modified starch. When two or more modified starches are used, the average amylose content is determined by weighted averaging the amylose contents of the two or more modified starches. For this reason, for example, when two or more modified starches are used and the average amylose content is adjusted to 45% by mass or more, a modified starch with an amylose content of less than 45% by mass may be contained.

In the modified starch (A), the water content in the modified starch (A) may be preferably 5 to 15% by mass.

As the modified starch (A), a commercially available modified starch may be used. Examples of a representative commercial product of the modified starch (A) include ECOFILM (trademark) and National 1658 (trademark), which are hydroxypropyl etherified starches manufactured by Ingredion Incorporated.

The content of the modified starch (A) is 40 to 98 parts by mass per 100 parts by mass in total of the components (A), (B), and (C). When the content of the modified starch (A) is less than 40 parts by mass or more than 98 parts by mass, the heat sealability, the gas barrier property, and the biodegradability tend to lower.

The content of the modified starch (A) is preferably 50 parts by mass or more, more preferably 60 parts by mass or more, and even more preferably 65 parts by mass or more, and is preferably 95 parts by mass or less. When the content of the modified starch (A) is equal to or more than the above lower limit, the heat sealability and the biodegradability tend to be improved, and when the content of the modified starch (A) is equal to or less than the above upper limit, the gas barrier property and the heat sealability tend to be improved.

<Polyvinyl Alcohol (B)>

The polyvinyl alcohol (B) is a polymer having a structural unit derived from vinyl alcohol (sometimes referred to as a vinyl alcohol unit). The polyvinyl alcohol (B) has a degree of saponification of 75.0 mol % or more. When the degree of saponification of the polyvinyl alcohol (B) is less than 75.0 mol %, the gas barrier property tends to lower. In the resin composition of the present invention, since the degree of saponification of the polyvinyl alcohol (B) is 75.0 mol % or more, the gas barrier property can be improved. The degree of saponification of the polyvinyl alcohol (B) is preferably 78 mol % or more, more preferably 85 mol % or more, and even more preferably 90 mol % or more, and is preferably 98.9 mol % or less, more preferably 98 mol % or less, and even more preferably 97 mol % or less. When the degree of saponification of the polyvinyl alcohol (B) is equal to or more than the above lower limit, the gas barrier property tends to be enhanced, and when the degree of saponification of the polyvinyl alcohol (B) is equal to or less than the above upper limit, the heat sealability tends to be enhanced. The degree of saponification refers to the molar fraction of hydroxyl groups to the total of hydroxyl groups and ester groups in the polyvinyl alcohol. The degree of saponification can be measured in accordance with JIS K 6726 (testing methods for polyvinyl alcohol), and can be measured, for example, by the method described in Examples.

The polyvinyl alcohol is produced, for example, by hydrolysis of polyvinyl acetate obtainable by polymerization of vinyl acetate monomers.

The viscosity at 20° C. of a 4% aqueous solution of the polyvinyl alcohol (B) as measured in accordance with JIS Z 8803 is preferably 1 mPa·s or more, more preferably 3 mPa·s or more, and even more preferably 5 mPa s or more, and is preferably 50 mPa·s or less, more preferably 45 mPa s or less, and even more preferably 35 mPa·s or less. When the viscosity of the polyvinyl alcohol (B) is in the above range, the heat sealability, the gas barrier property, and the biodegradability tend to be enhanced. The viscosity can be measured by the method described in Examples.

The polyvinyl alcohol (B) can further comprise another monomer unit other than a vinyl alcohol unit. Examples of the other monomer unit include monomer units derived from ethylenically unsaturated monomers. Examples of the ethylenically unsaturated monomers include α-olefins such as ethylene, propylene, n-butene, isobutylene, and 1-hexene; acrylic acid and salts thereof; unsaturated monomers having an acrylic acid ester group; methacrylic acid and salts thereof; unsaturated monomers having a methacrylic acid ester group; acrylamide, N-methylacrylamide, N-ethylacrylamide, N,N-dimethylacrylamide, diacetoneacrylamide, acrylamidopropanesulfonic acid and salts thereof, acrylamidopropyldimethylamine and salts thereof (e.g., quaternary salts); methacrylamide, N-methylmethacrylamide, N-ethylmethacrylamide, methacrylamidopropanesulfonic acid and salts thereof, methacrylamidopropyldimethylamine and salts thereof (e.g., quaternary salts); vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; vinyl cyanides such as acrylonitrile and methacrylonitrile; halogenated vinyls such as vinyl chloride and vinyl fluoride; halogenated vinylidenes such as vinylidene chloride and vinylidene fluoride; allyl compounds such as allyl acetate, 2,3-diacetoxy-1-allyloxypropane, and allyl chloride; unsaturated dicarboxylic acids such as maleic acid, itaconic acid, and fumaric acid, and salts or esters thereof; vinylsilyl compounds such as vinyltrimethoxysilane; isopropenyl acetate; vinyl ester monomers such as vinyl formate, vinyl acetate, vinyl propionate, vinyl butyrate, vinyl isobutyrate, vinyl pivalate, vinyl versatate, vinyl caproate, vinyl calrylate, vinyl laurate, vinyl palmitate, vinyl stearate, vinyl oleate, and vinyl benzoate. The content of the other monomer unit is preferably 10 mol % or less, and more preferably 5 mol % or less, with respect to the total molar amount of the structural units constituting the polyvinyl alcohol (B).

The method for producing the polyvinyl alcohol is not particularly limited. Examples thereof include a method comprising polymerizing a vinyl acetate monomer optionally with another monomer, and saponifying the resulting polymer to convert into a vinyl alcohol unit. Examples of a polymerization manner used in polymerization include batch polymerization, semi-batch polymerization, continuous polymerization, and semi-continuous polymerization. Examples of the polymerization method include known methods such as a mass polymerization method, a solution polymerization method, a suspension polymerization method, and an emulsion polymerization method. As the saponification of the polymer, a publicly-known method can be applied. For example, the saponification may be performed in a state where the polymer is dissolved in an alcohol or a hydrous alcohol. The alcohol that can be used at that time is a lower alcohol such as methanol and ethanol. The polyvinyl alcohol (B) may be used singly or two or more species thereof may be used in combination.

The content of the polyvinyl alcohol (B) is 2 to 60 parts by mass with respect to 100 parts by mass in total of the components (A), (B), and (C). If the content of the polyvinyl alcohol (B) is less than 2 parts by mass or more than 60 parts by mass, the heat sealability, the gas barrier property, and the biodegradability tend to lower.

The content of the polyvinyl alcohol (B) is preferably 5 parts by mass or more, and is more preferably 50 parts by mass or less, even more preferably 40 parts by mass or less, and particularly preferably 35 parts by mass or less. When the content of the polyvinyl alcohol (B) is equal to or more than the above lower limit, the gas barrier property and the heat sealability tend to be improved, and when the content of the polyvinyl alcohol (B) is equal to or less than the above upper limit, the heat sealability and the biodegradability tend to be improved.

<Clay (C)>

The resin composition of the present invention may optionally comprise a clay (C). In the present description, "optionally comprise" means that the component may or may not be contained. The clay (C) may be a natural clay, a synthetic clay, or an organic clay. Examples of the clay include synthetic or natural layered silicate clays such as montmorillonite, bentonite, beidellite, mica, hectorite, saponite, nontronite, sauconite, vermiculite, ledikite, magadite, kenyaite, stevensite, and volkonskoite. The clay (C) may be used singly or two or more species thereof may be used in combination.

The organized clay is the aforementioned clay organized (or modified) with an organizing agent (or a modifier). The organizing agent is not particularly limited, and examples thereof include quaternary ammonium salts having an alkyl group, a benzyl group, a pyridyl group, tallow, or hydrogenated tallow prepared by hydrogenating tallow, tertiary ammonium salts, and secondary ammonium salts. Examples of the alkyl group include alkyl groups having 1 to 20 carbon atoms such as a methyl group, an ethyl group, a propyl group, a butyl group, a pentyl group, a hexyl group, a heptyl group, an octyl group, a nonyl group, and a decyl group.

The clay (C) to be used may be a commercially available product. The commercially available product is not particularly limited, and examples thereof include CLOISITE (registered trademark) 20A (montmorillonite organized with dimethyl di(hydrogenated tallow) quaternary ammonium salt, manufactured by Southern Clay Industries).

The content of the clay (C) is preferably less than 2 parts by mass, more preferably 1.5 parts by mass or less, even more preferably 1 part by mass or less, further preferably 0.5 parts by mass or less, and particularly preferably 0.2 parts by mass or less, and is preferably 0 part by mass or more, per 100 parts by mass in total of the components (A), (B) and (C). When the content of the clay (C) is equal to or less than the above upper limit, the peak temperature of tan δ is easily adjusted to 128° C. or less and a superior heat sealability tend to be exhibited.

<Additives>

(Polyoxyalkylene (D))

The resin composition of the present invention may optionally comprise a polyoxyalkylene (D). The polyoxyalkylene (D) represents a polyalkylene oxide and a polyalkylene glycol and has a structural unit represented by the following Formula (1) (also referred to as a structural unit (1)). The polyoxyalkylene (D) may have two or more different structural units (1).

[Chemical Formula 1]

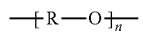

(1)

[In the formula, R is an alkylene group and n is 1 or more.]

In the Formula (1), examples of the alkylene group include alkylene groups having 2 to 10 carbon atoms such as an ethylene group, a propylene group, a trimethylene group, a butylene group, an isobutylene group, a pentylene group, a hexylene group, a heptylene group, an octylene group, a nonylene group and a decylene group. Among them, alkylene groups having 2 to 6 carbon atoms are preferable, and an ethylene group and/or a propylene group is more preferable from the viewpoint of heat sealability and gas barrier property. When n is 2 or more, these alkylene groups may be used singly or two or more of them may be used in combination.

n in Formula (1) is preferably 5 or more, more preferably 50 or more, and even more preferably 100 or more, and is preferably 120,000 or less, and more preferably 70,000 or less from the viewpoint of heat sealability and gas barrier property. When the polyoxyalkylene (D) contains different structural units (1), the number of repetition n of each structural unit may be the same or different.

Examples of the polyalkylene oxide include polymers having a structural unit derived from an alkylene oxide having 2 to 6 carbon atoms, and specifically include polyethylene oxide, polypropylene oxide, polytrimethylene oxide (polyoxethane), polybutylene oxide, polyisobutylene oxide, and copolymers of monomers constituting the foregoing. Examples of the polyalkylene glycol include polymers having a structural unit derived from an alkylene glycol having 2 to 6 carbon atoms, and specifically include polyethylene glycol, polypropylene glycol, polytrimethylene glycol, polybutylene glycol, polyisobutylene glycol, and copolymers of monomers constituting the foregoing. Among them, the polyoxyalkylene (D) is preferably polyethylene oxide, polypropylene oxide, polyethylene glycol, polypropylene glycol, or copolymers of monomers constituting them from the viewpoint of heat sealability and gas barrier property. As the copolymer, a copolymer of ethylene oxide and propylene oxide, a copolymer of ethylene glycol and propylene glycol, and the like are preferable.

The polyoxyalkylene (D) may contain a structural unit derived from a monomer other than the structural unit (1) as long as the effect of the present invention is not impaired. When the polyoxyalkylene (D) is a copolymer, the polymerization mode of the copolymer is not particularly limited, and it may be in a random mode, a block mode, a graft mode, or a tapered mode. The polyoxyalkylene (D) may be used singly or two or more species thereof may be used in combination.

The weight average molecular weight of the polyoxyalkylene (D) is preferably 10,000 or more, more preferably 50,000 or more, and is preferably 5,000,000 or less, and more preferably 3,000,000 or less from the viewpoint of heat sealability and gas barrier property.

As the polyoxyalkylene (D), a commercially available product may be used. Examples of representative commercial products of the polyoxyalkylene (D) include ALKOX (trademark) E-75G, ALKOX (trademark) L-11, ALKOX (trademark) L-6, and ALKOX (trademark) EP1010N manufactured by Meisei Chemical Works, Ltd., PEO (trademark) PEO-1 and PEO-2 manufactured by Sumitomo Seika Chemicals Co., Ltd.

The content of the polyoxyalkylene (D) is preferably 10 parts by mass or less and more preferably 5 parts by mass or less, and is preferably 0 part by mass or more with respect to the mass of the resin composition from the viewpoint of heat sealability and gas barrier property.

(Polyol Plasticizer (E))

The resin composition of the present invention may optionally comprise a polyol plasticizer (E). The polyol plasticizer (E) is not particularly limited and examples thereof include sorbitol, maltitol, xylitol, erythritol, sucrose, mannitol, lactitol, arabinose, xylose, fructose, glucose, galactose, ribose, trehalose, glycerol, ethylene glycol, and propylene glycol. These polyol plasticizers (E) may be used singly or two or more of them may be used in combination. Among these, from the viewpoint of heat sealability and oxygen barrier property, at least one selected from the group consisting of sorbitol, maltitol, xylitol, erythritol, sucrose, mannitol, lactitol, arabinose, xylose, fructose, glucose, galactose, ribose, trehalose and glycerol is preferably contained in the polyol plasticizer (E), and at least one selected from the group consisting of sorbitol, xylitol and sucrose is more preferably contained. As the polyol plasticizer (E), for example, a commercially available product may be used. The commercially available product is not particularly limited, and examples thereof include Sorbitol SP manufactured by B Food Science Co., Ltd.

The content of the polyol plasticizer (E) is preferably 20 parts by mass or less, more preferably 10 parts by mass or less, and even more preferably 5 parts by mass or less, and is preferably 0 part by mass or more with respect to the mass of the resin composition from the viewpoint of heat sealability and gas barrier property.

(Other Additives)

The resin composition of the present invention may comprise a fatty acid having 12 to 22 carbon atoms and/or a fatty acid salt thereof. Examples of the fatty acid having 12 to 22 carbon atoms and a fatty acid salt thereof include stearic acid, calcium stearate, sodium stearate, palmitic acid, lauric acid, myristic acid, linoleic acid, and behenic acid. Among these, stearic acid, calcium stearate, and sodium stearate are preferable from the viewpoint of processability. The fatty acids having 12 to 22 carbon atoms and the fatty acid salts thereof may be used singly or two or more of them may be used in combination.

When the resin composition of the present invention contains a fatty acid having 12 to 22 carbon atoms and/or a fatty acid salt thereof, the content thereof is preferably 0.01 to 3% by mass, more preferably 0.03 to 2% by mass, and even more preferably 0.1 to 1% by mass, with respect to the mass of the resin composition. When the content of the fatty acid having 12 to 22 carbon atoms and/or the fatty acid salt thereof is in the above range, it tends to be advantageous in terms of processability.

The resin composition of the present invention may comprise a plasticizer (F) other than the polyol plasticizer (E). Examples of the plasticizer (F) include water, glycerol trioleate, epoxidized linseed oil, epoxidized soybean oil, tributyl citrate, acetyltriethyl citrate, glyceryl triacetate, and 2,2,4-trimethyl-1,3-pentanediol diisobutyrate. The plasticizer (F) may be used singly or two or more species thereof may be used in combination. Among these plasticizers (F), water is preferable from the viewpoint of being able to obtain good film-forming property and coating property.

The water content in the resin composition is preferably 3 to 20% by mass, more preferably 4 to 18% by mass, and even more preferably 7 to 15% by mass, with respect to the mass of the resin composition, from the viewpoint of being easy to enhance the film-forming property and the gas barrier property of the resin composition. The water content can be determined, for example, by measuring at 130° C. for 60 minutes using a heat-drying moisture meter.

The resin composition of the present invention may further comprise additives (G) such as fillers, processing stabilizers, weather resistance stabilizers, coloring agents, ultraviolet absorbing agents, light stabilizers, antioxidants, antistatic agents, flame-retardants, other thermoplastic resins, lubricants, perfumes, antifoaming agents, deodorants, bulking agents, releasing agents, mold releasing agents, reinforcing agents, crosslinking agents, fungicides, antiseptics, and crystallization rate retardants, as necessary.

In the resin composition of the present invention, the total content of the modified starch (A), the polyvinyl alcohol (B), and the clay (C) is preferably 60% by mass or more, more preferably 80% by mass or more, even more preferably 85% by mass or more, and further preferably 90% by mass or more with respect to the mass of the resin composition, and is preferably 100% by mass or less. When the total content of the components (A), (B) and (C) is in the above range, the heat sealability and the gas barrier property tend to be improved.

<Resin Composition>

The resin composition of the present invention comprises 40 to 98 parts by mass of the modified starch (A), 2 to 60 parts by mass of the polyvinyl alcohol (B), and optionally the clay (C), wherein the peak temperature of tan δ in measurement of dynamic viscoelasticity in a range of 20° C. to 150° C. is 128° C. or lower, and thus can achieve both a superior heat sealability and a superior gas barrier property. Furthermore, the resin composition is also superior in biodegradability. Thus, when the resin composition of the present invention is used, a food packaging material or the like can be easily formed without using any adhesive material. In addition, such a packaging material can be superior in biodegradability and gas barrier property. In the present description, heat sealability refers to a property of being able to adhere by heat.

The tan δ represents a loss tangent (E"/E') which is a ratio of a storage elastic modulus (E') to a loss elastic modulus (E") both obtained in dynamic viscoelasticity measurement. The peak temperature of tan δ indicates the temperature at the peak of tan δ in the graph (the horizontal axis represents temperature (° C.), and the vertical axis represents tan δ) obtained when dynamic viscoelasticity is measured in the range of 20° C. to 150° C. The measurement of dynamic viscoelasticity can be performed by pulling a resin composition (sheet) with a sine wave of 11 Hz using a dynamic viscoelasticity analyzer while raising the temperature in the range of 20° C. to 150° C. at a rate of 3° C./min. In the graph (sometimes referred to as a tan δ curve) in the range of 20° C. to 150° C., when there are two or more peaks of tan δ, the temperature at the peak present on the highest temperature side is taken as the peak temperature of tan δ. In order to prevent volatilization of water in the resin composition due to the raising temperature, petrolatum or the like may be applied to both surfaces of the resin composition (sheet) before measurement. Such a peak temperature of tan δ can be calculated, for example, by the method described in Examples.

The resin composition of the present invention has a peak temperature of tan δ of 128° C. or lower. If the peak temperature of tan δ exceeds 128° C., the gas barrier property and the heat sealability, especially the heat sealability tend to significantly deteriorate.

In the resin composition of the present invention, the peak temperature of tan δ is preferably 125° C. or lower, more preferably 120° C. or lower, and even more preferably 118° C. or lower, and is preferably 50° C. or higher, more preferably 70° C. or higher, and even more preferably 80° C. or higher. When the peak temperature of tan δ is in the above range, the gas barrier property and the heat sealability, especially the heat sealability tends to be improved.

The peak temperature of tan δ in the resin composition of the present invention can be adjusted, for example, by appropriately changing the types and contents of the modified starch (A), the polyvinyl alcohol (B), and the clay (C), the degree of saponification of the polyvinyl alcohol (B), and the content of amylol in the modified starch (A). For example, the peak temperature of tan δ tends to decrease as the content of the modified starch (A), the content of the clay (C), and the degree of saponification of the polyvinyl alcohol (B) decrease, or the content of the polyvinyl alcohol (B) increases. In particular, when the content of the clay (C) is large, the peak temperature of tan δ tends to remarkably increase, and thus the content of the clay (C) is preferably adjusted to 1% by mass or less in the resin composition.

The resin composition of the present invention is superior in gas barrier property, especially oxygen barrier property. The oxygen permeability (mL·20 μm/[m$^2$ atm·24·hr]) of the resin composition of the present invention at 23° C. and 50% RH is preferably 8.0 or less, more preferably 5.0 or less, even more preferably 4.0 or less, further preferably 3.5 or less, and particularly preferably 3.0 or less. When the oxygen permeability of the resin composition is equal to or less than the above upper limit, a superior oxygen barrier property can be exhibited. The oxygen permeability (mL·20 μm/[m$^2$ atm 0.24 hr]) is usually 0.01 or more. The oxygen permeability of the resin composition can be measured with an oxygen permeation analyzer after storing the resin composition at 23° C. and 50% RH for two weeks to adjust the humidity, and can be measured, for example, by the method described in Examples. In the present description, the expression that the oxygen barrier property is improved or enhanced means that the oxygen permeability is reduced, and the expression that an item is superior in oxygen barrier property means that the item is low in oxygen permeability.

The resin composition of the present invention can exhibit a superior heat sealability even in a low-humidity environment, which is believed to be disadvantageous for resin compositions containing the modified starch (A). Thus, the resin composition of the present invention is superior in heat seal strength in a low-humidity environment. The heat seal strength of the resin composition of the present invention at 20° C. and 30% RH is preferably 1.0 N/15 mm or more, more preferably 3.0 N/15 mm or more, even more preferably 4.0 N/15 mm or more, further preferably 5.0 N/15 mm or more, and particularly preferably 5.5 N/15 mm or more. When the heat seal strength is equal to or more than the above lower limit, a superior heat sealability tends to be exhibited. The upper limit of the heat seal strength is usually 30 N/15 mm or less. The heat seal strength at 20° C. and 30% RH can be measured, for example, by the method described in Examples.

The resin composition of the present invention may be in the form of a pellet or a film or sheet. When the resin composition of the present invention is used as a film or a sheet, the thickness of the film is commonly 5 μm to 100 μm, and the thickness of the sheet is commonly 100 μm to 1000 μm. Further, the film or sheet may have a single layer body or a multiple layer body. In the present specification, the term "sheet" can be substituted for "film", and the term "film" can be substituted for "sheet".

[Method for Producing Resin Composition]

The resin composition of the present invention can be produced by, for example, a method comprising at least Step (1) of mixing the modified starch (A) and the polyvinyl alcohol (B) to obtain a mixture, Step (2) of extruding the mixture, and Step (3) of cooling and drying the extruded mixture.

Step (1) is a step of mixing at least the modified starch (A) and the polyvinyl alcohol (B), and optionally, at least one selected from the group consisting of the clay (C), the polyoxyalkylene (D), the polyol plasticizer (E) and other additives (for example, the aforementioned fatty acid having 12 to 22 carbon atoms and/or a fatty acid salt thereof, the aforementioned plasticizer (F), and the aforementioned additive (G)) may be mixed together.

Step (1) is usually performed using an extruder. In the extruder, a shearing stress is applied to each component with a screw, and each component is uniformly mixed while heating by application of the external heat to a barrel.

As the extruder, for example, a twin screw extruder can be used. The twin screw extruder may be co-rotation or reverse rotation. The screw diameter may be, for example, 20 to 150 mm, and the ratio L/D ratio of the extruder length (L) to the screw diameter (D) may be, for example, 20 to 50. The rotation speed of the screw is preferably 80 rpm or more, and more preferably 100 rpm or more. The extrusion pressure is preferably 5 bar (0.5 MPa) or more, and more preferably 10 bar (1.0 MPa) or more. Each component can be introduced directly into the extruder. Further, each of the components may be premixed using a mixer and then introduced into the extruder.

In Step (1), from the viewpoint of being easy to enhance the film-forming property and the oxygen barrier property of the resin composition, it is preferable to mix a plasticizer (F), preferably water, in an amount whose lower limit is preferably 0.1% by mass or more, more preferably 1% by mass or more, even more preferably 10% by mass or more, particularly preferably 15% by mass or more, and most preferably 20% by mass or more with respect to the mass of the mixture and whose upper limit is preferably 50% by mass or less, more preferably 45% by mass or less, and even more preferably 40% by mass or less. Here, the mass of the mixture is the total mass of the mixture including the plasticizer (F). In Step (1), the plasticizer (F) may be introduced into the extruder at an initial stage of extrusion, and the plasticizer (F) can be introduced before the temperature reaches the aforementioned heating temperature, for example, at 100° C. or lower. The modified starch (A) is subjected to the cooking treatment by the combination of the moisture, the heat, and the shearing stress, and can be gelatinized (gelled). Further, by separately introducing the plasticizer (F), preferably water, a water-soluble polymer such as the polyvinyl alcohol (B) is dissolved, the resin composition is softened, and the modulus and the brittleness can be reduced.

In Step (1), cooking treatment is performed by heating to a temperature of preferably higher than 100° C. and 150° C. or lower, and more preferably 115° C. or higher and 140° C. or lower. Here, the cooking treatment is treatment of grinding and gelling starch particles. The heating can be performed by applying heat to the barrel of the extruder from the outside. Each barrel can be heated to a target temperature by applying temperature that is changed stepwise. When the cooking treatment is performed at a temperature higher than 120° C., this is advantageous in terms of processability.

In order to prevent foaming, it is preferable to push the cooked mixture toward a die while cooling it to a temperature of preferably 85 to 120° C., more preferably 90 to 110° C. Further, by exhausting the air from the barrel, foaming can be prevented and the moisture can be removed.

The residence time in the extruder can be set according to the temperature profile and the screw speed, and is preferably 1 to 2.5 minutes.

In Step (2) of extruding the mixture, the molten mixture that has been pushed in the extruder while being melt-kneaded is extruded through the die. The temperature of the die is preferably 85 to 120° C., and more preferably is 90 to 110° C.

In Step (3) of cooling and drying the extruded mixture (melt), the mixture (melt) may be extruded into a film shape, a sheet shape, or a strand shape.

When the mixture is extruded into a film shape, the mixture can be extruded through a die for forming a film, and then cooled and dried while being wound with a winding roller. It is preferable to cool the mixture between the die and the roller so as to prevent the mixture from adhering to the roller. A shaping roll may be installed between the die and the roller. The material of the shaping roll is, for example, rubber, resin, or metal. For drying, the roll may be warmed or dehumidified air may be supplied during winding. In the case of the blowing-tube method, the dehumidified air can be used in order to inflate the film when the film is released from the die. By accompanying talc in the air stream, blocking of the film can be prevented.

When the mixture is extruded into a strand shape, the mixture is extruded through a multi-hole strand nozzle, and strands are cut with a rotary cutter, so that the strands can be formed into a pellet shape. In order to prevent the pellets from agglutinating, the moisture in the pellets may be removed by applying vibration periodically or regularly and using hot air, dehumidified air or an infrared heater.

[Hydrous Composition]

The present invention includes a hydrous composition comprising the resin composition described above and having a water content of 1 to 50% by mass. In one embodiment of the present invention, in the case of forming a coated product described later using a resin composition, in order to enhance the film-forming property of the resin composition, for example when the resin composition is applied to a paper or a film, a hydrous composition may be prepared by adding water to the resin composition. The water content can be determined by measuring a resin composition or a hydrous composition pulverized to have a maximum particle diameter of 1 mm or less, at 130° C. for 60 minutes using a heat-drying moisture meter. In the present description, it is meant the hydrous composition includes all of the resin compositions containing water having a water content of 1 to 50% by mass measured by the above method. That is, the hydrous composition is meant to include a resin composition having a water content in the above range at the time of production as well as a resin composition having a water content adjusted to the above range by adding water to a resin composition.

The water content of the hydrous composition of the present invention is preferably 5% by mass or more, and more preferably 8% by mass or more, and is preferably 45% by mass or less, and more preferably 40% by mass or less. When the water content is in the above range, it is easy to enhance the gas barrier property and the winding property at the time of forming a coated product.

In a preferred embodiment of the present invention, the hydrous composition of the present invention can be prepared by adding water to the resin composition described above and, for example, stirring and mixing the mixture. In order to prevent the resin compositions from agglutinating to each other and to adsorb water to the entire pellet, it is preferable to perform stirring while adding water in two or more portions. Further, in order to keep the water content constant, the hydrous composition may be stored in a closed container.

[Coated Product and Method for Production Thereof]

The present invention includes a coated product in which a paper or a film (or sheet) is coated with the hydrous composition of the present invention. That is, the coated product is a laminate having a layer comprising a hydrous composition and a layer comprising a paper or a film (or sheet). Since the coated product of the present invention is superior in gas barrier property and biodegradability and can exhibit heat sealability, a packaging material or the like can be easily and efficiently manufactured by heat without using any adhesive material, for example.

When the hydrous composition is applied to a paper, the paper is not particularly limited, and examples thereof include kraft paper, woodfree paper, simili paper, glassine paper, parchment paper, synthetic paper, white paperboard, manila board, milk carton paper, cup base paper, ivory paper, silver-white paper, thin paper, paperboard, and rayon paper. The thickness of the paper in the coated product is not particularly limited, and is preferably 1 to 500 µm, and more preferably 10 to 300 µm. When the thickness of the paper in the coated product is in the above range, the winding speed at the time of producing the coated product can be increased and the productivity tends to be improved.

When the hydrous composition is applied to a film, the film is not particularly limited and examples thereof include polyethylene terephthalate (PET) film, biaxially oriented polypropylene (BOPP) film, polyethylene (PE) film (preferably low density polyethylene (LDPE) film), and polylactic acid film. The thickness of the film in the coated product is not particularly limited, and is preferably 1 to 500 µm, more preferably 10 to 300 µm, and even more preferably 50 to 100 µm.

The thickness of the hydrous composition in the coated product of the present invention is preferably 1 to 300 µm, more preferably 5 to 100 µm, and even more preferably 10 to 50 µm. When the thickness of the hydrous composition in the coated product is in the above range, a good film-forming property, a good heat sealability, and a good gas barrier property tend to be obtained.

The coated product of the present invention is superior in gas barrier property, especially oxygen barrier property. The oxygen permeability of the coated product can be chosen from the same range as the oxygen permeability of the resin composition.

The method for producing the coated product of the present invention is not particularly limited as long as a paper or a film can be coated with a hydrous composition. In a preferred embodiment, the coated product of the present invention can be produced by a method comprising a step of coating a film or a paper conveyed by a take-up machine with the hydrous composition by using an extruder (this step is referred to as Step (A)).

In one embodiment of the present invention, the hydrous composition is charged into the extruder in Step (A). Examples of the extruder include a single screw extruder and a twin screw extruder. The screw diameter of the extruder is, for example, 20 to 150 mm, the ratio L/D ratio of the extruder length (L) to the screw diameter (D) is, for example, 15 to 50, and the rotation speed of the screw is preferably 80 rpm or more, and more preferably 100 rpm or more. The cylinder temperature in the extruder may be, for example, 80 to 120° C., and preferably 90 to 110° C.

The hydrous composition charged into the extruder is plasticized and discharged through a die outlet. A paper or a film is conveyed by a take-up machine, preferably a roller type take-up machine. By coating the conveyed paper or film with the hydrous composition discharged through the die outlet, a coated product is obtained. The resulting coated product is conveyed while being pressure-bonded to a paper or a film between a plurality of rolls including a metal roll, and can be wound into a roll form by a winding machine. Examples of the plurality of rolls include pressure rolls, cast rolls, and touch rolls.

In the step, the draw ratio represented by the following formula is preferably 5 to 20. When a coated product is produced with such a draw ratio, the productivity is improved and a coated product superior in adhesion between a paper or a film and a hydrous composition as well as in oxygen barrier property tends to be obtained. The flow rate at the die outlet of the extruder is represented by (discharge amount)/((lip opening)×(die width)). When the discharge amount is expressed by the mass per unit time, the discharge amount is preferably 1 to 500 kg/hr, and more preferably 5 to 200 kg/hr, the lip opening is preferably 0.01 to 5 mm, and more preferably 0.1 to 1 mm, and the die width is preferably 100 to 3000 mm, and more preferably 200 to 2000 mm. In the present invention, since the water of the hydrous composition evaporates during the above-described production process, the water content of the hydrous composition in the resulting coated product is reduced as compared with that before the production.

$$\text{Draw ratio} = \text{(Winding speed of the winding device)} / \text{(Flow rate at the die outlet of the extruder)}$$

[Multilayer Structure]

The present invention includes a multilayer structure comprising the coated product and one or more layers (X). Examples of the layer (X) include a protective layer, a gas barrier layer different from the hydrous composition, a moisture-proof layer, a light-shielding layer, a printing layer, and a reinforcing layer. Examples of the material forming the layer (X) include polyethylene, polypropylene, ethylene-vinyl acetate copolymer, EVOH, polyvinyl chloride, polyurethane, polyesters such as polyethylene terephthalate, polybutylene terephthalate and polyethylene naphthalate, polyamides such as nylon, polyacrylonitrile, cellulose or derivatives thereof, glass, and wood. As to the layer (X), either a single layer or two or more layers may be provided, and it may include either a single layer or multiple layers. When there are two or more layers (X), the thickness and material of each layer may be either different or the same. The layer (X) may be laminated on a hydrous composition, a paper, or a film with an adhesive layer (Y) interposed therebetween.

The adhesive that forms the adhesive layer (Y) is not particularly limited and examples thereof include acrylic adhesives, urethane-based adhesives, epoxy-based adhesives, vinyl acetate-based adhesives, ethylene-vinyl acetate-based adhesives, vinyl chloride-based adhesives, silicone-based adhesives, nitrile cellulose-based adhesives, phenol-based adhesives, polyvinyl alcohol-based adhesives, melamine-based adhesives, and styrene-based adhesives.

The multilayer structure of the present invention comprises the coated product (paper or film coated with a hydrous composition) and one or more layers (X), and in a preferred embodiment of the present invention, the multilayer structure has a hydrous composition (a layer formed of a hydrous composition) as the outermost surface. According to such an embodiment, a food packaging material or the like can be easily formed using the multilayer structure because the hydrous composition of the outermost surface can be adhered by heat.

In a preferred embodiment of the invention, in the multilayer structure of the invention, at least one layer (X) is preferably disposed on the outermost surface opposite from the hydrous composition with respect to the paper or film. In such an embodiment, by applying decorations such as characters and patterns to the surface of the layer (X), a label, a seal, a packaging material on which characters or decorations are applied, and the like can be formed.

The layer configuration of the multilayer structure of the present invention is not particularly limited, and examples thereof include a layer configuration having hydrous composition/paper or film/adhesive layer (Y)/layer (X) in this order; and a layer configuration having hydrous composition/paper or film/layer (X) in this order. The thickness of the layer (X) is not particularly limited, and is preferably 1 to 1000 μm, and more preferably 5 to 500 μm.

[Bonded Body and Packaging Material]

The present invention includes a bonded body in which the hydrous composition of the coated product or the multilayer structure and an adhered layer are thermally adhered together. Examples of the adhered layer include a layer selected from the group consisting of the hydrous composition, the paper, the film, and the layer (X) contained in the coated product, the multilayer structure, another coated product, or another multilayer structure, or a layer contained in an adhered body other than those mentioned above. In other words, examples of the adhered layer include a layer selected from the group consisting of the hydrous composition, the paper, the film and the layer (X) contained in the coated product or the multilayer structure; a layer selected from the group consisting of a hydrous composition, a paper, a film, and a layer (X) contained in another coated product that is not the coated product; a layer selected from the group consisting of a hydrous composition, a paper, a film, and a layer (X) contained in another multilayer structure that is not the multilayer structure; and a layer contained in an adhered body that is none of the coated product, the multilayer structure, the another coated product, and the another multilayer structure.

When two or more coated products of the present invention are used, the another coated product means the coated product to be bonded. When two or more multilayer structures of the present invention are used, the another multilayer structure means the multilayer structure to be bonded.

The adhered layer is preferably the hydrous composition contained in the coated product, the multilayer structure, another coated product, or another multilayer structure. When the adhered layer is the hydrous composition contained in the coated product or the multilayer structure, the bonded body can be produced using one sheet. When the adhered layer is the hydrous composition contained in another coated product or another multilayer structure, the bonded body can be produced using two or more sheets.

The thermal bonding (heat sealing) can be performed with a conventional heat sealing machine. Since the bonded body of the present invention is formed by thermally bonding a hydrous composition superior in heat sealability, the bonded body can have sufficient adhesive strength even in a low-humidity environment. Furthermore, it is also superior in gas barrier property and biodegradability.

Figure 2:
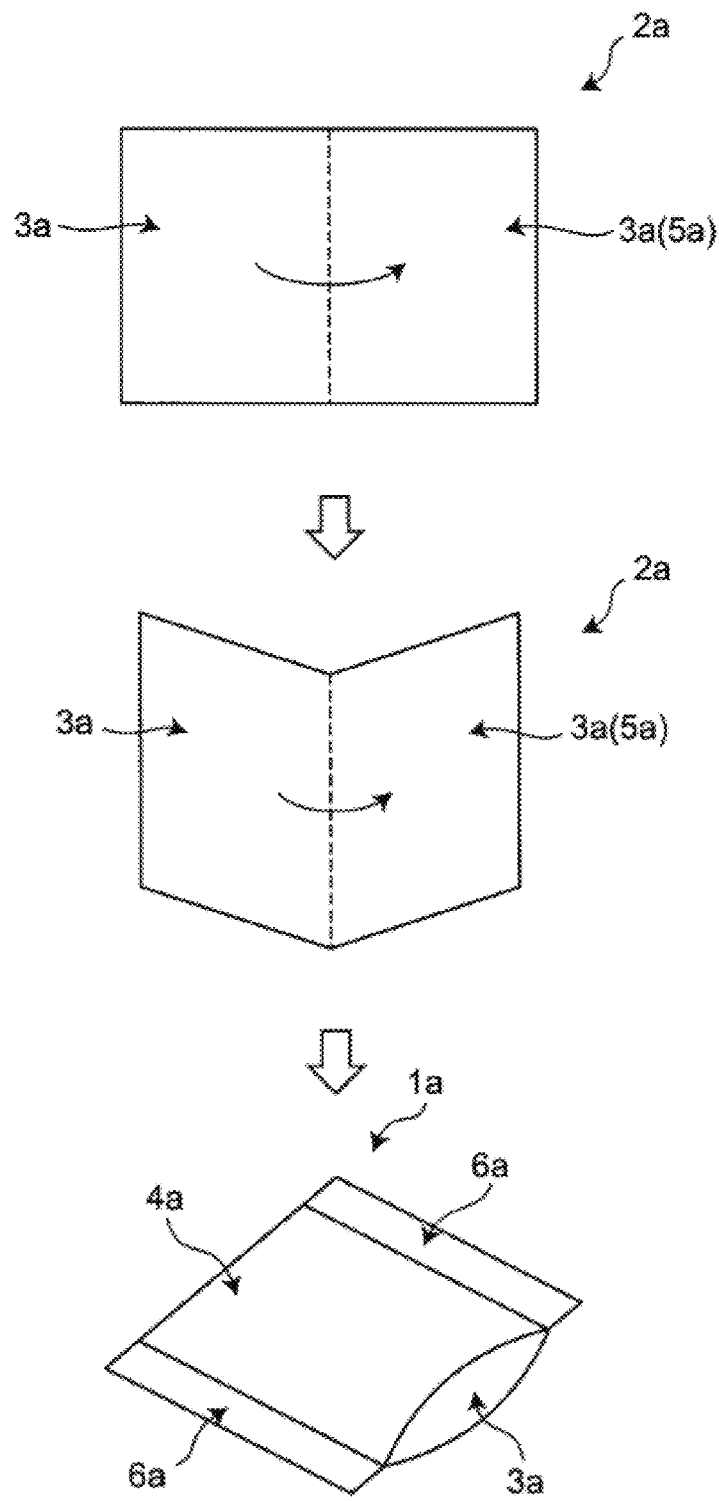
FIG. 2 is a schematic view showing a bonded body according to one embodiment of the present invention and a method for producing the same.

The bonded body (two-side-sealed bag) shown in FIG. 2 is a two-side-sealed bag made of one coated product and is a product fabricated by folding the coated product 2a into two and thermally bonding (heat-sealing) both end portions. The coated product 2a is a coated product having a layer configuration shown in FIG. 1.

As shown in FIG. 2, the bonded body 1a can be obtained by folding the coated product 2a in half with the hydrous composition 3a side facing inward, and then thermocompression bonding the thermocompression bonding portions 6a at both ends from the paper or film 4a side. Since the thermocompression bonding portions 6a can be bonded by thermocompression bonding to form thermally bonded portions, the bonded body 1a functions as a two-side-sealed bag.

The bonded body (two-side-sealed bag) 1a has an opening. For example, after putting contents into the bag, the bag can be sealed by thermally bonding the vicinity of the opening.

FIG. 2 shows an embodiment in which the adhered layer 5a is the hydrous composition contained in the same coated product, but a bonded body may be fabricated by appropriately changing portions to be thermally bonded and using the paper or the film contained in the same coated product as an adhered layer, or a bonded body may be fabricated by changing the coated product 2a for a multilayer structure, appropriately changing the thermocompression bonding portions (thermally bonded portions), and using the hydrous composition, the paper or the film, or the layer (X) contained in the same multilayer structure as an adhered layer.

Figure 3:
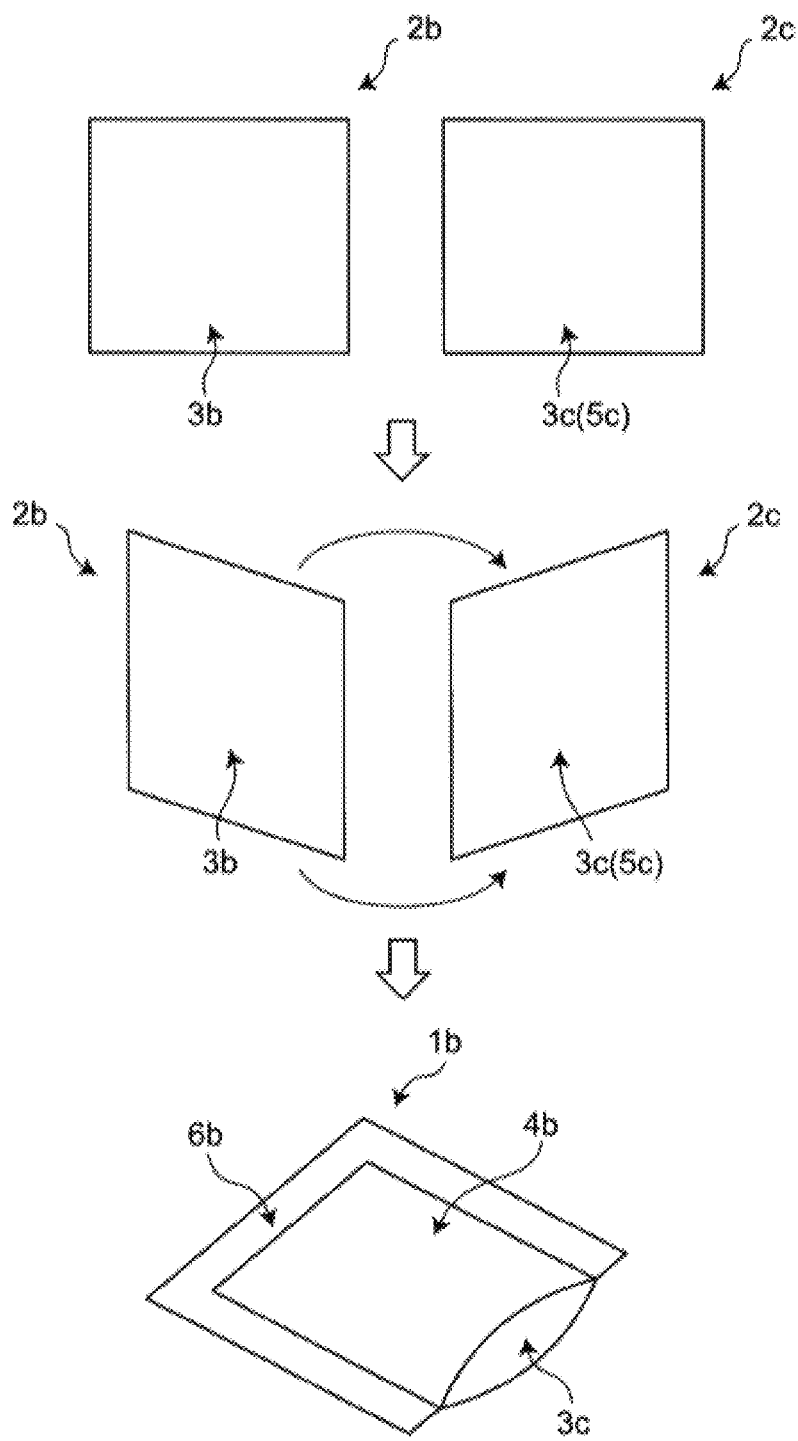
FIG. 3 is a schematic view showing a bonded body according to one embodiment of the present invention and a method for producing the same.

The bonded body 1b shown in FIG. 3 is a three-side-sealed bag made of two coated products, and is a product fabricated by thermally bonding the vicinities of three sides of the two coated products 2b and 2c to each other. Each of the coated products 2b and 2c has the layer configuration shown in FIG. 1.

As shown in FIG. 3, the bonded body 1b can be obtained by superimposing two coated products 2b and 2c on each other with the hydrous compositions 3b and 3c facing inward, and then thermocompression bonding the thermocompression bonding portions 6b positioned at the vicinities of three sides of the superimposed laminate from the papers or films 4b and 4c sides. Since the thermocompression bonding portions 6b are bonded by thermocompression bonding to form a thermally bonded portion, the bonded body 1b functions as a three-side-sealed bag.

The bonded body (three-side-sealed bag) 1b has an opening. For example, after putting contents into the bag, the bag can be sealed by thermally bonding the vicinity of the opening.

FIG. 3 shows an embodiment in which the adhered layer 5c is the hydrous composition contained in another coated product, but a bonded body may be fabricated by appropriately changing portions to be thermally bonded and using the paper or the film contained in another coated product as an adhered layer, or a bonded body may be fabricated by changing at least the coated product 2c for a multilayer structure, appropriately changing the thermocompression bonding portions (thermally bonded portions), and using the hydrous composition, the paper or the film, or the layer (X) contained in another multilayer structure as an adhered layer.

It is also possible to form a bonded body using an adhered body other than the coated product or the multilayer structure of the present invention, and for example, in the embodiment shown in FIG. 3, the adhered body may be used instead of one of the coated products. The adhered body may have a hydrous composition, but also may not have a hydrous composition, and may be, for example, the paper or film previously mentioned.

The total number of the coated product(s) and the multilayer structure(s) forming the bonded body of the present invention is not particularly limited, and is preferably 1 to 3, and more preferably 1 or 2. In a preferred embodiment of the present invention, the adhered layer is the hydrous composition contained in the coated product, the multilayer structure, another coated product, or another multilayer structure. Since in the bonded body in such an embodiment, the hydrous composition of the coated product or the multilayer structure and the hydrous composition contained in the coated product, the multilayer structure, another coated product, or another multilayer structure are thermally bonded (heat-sealed) together, the bonded body can have a more enhanced adhesive strength. In the embodiment shown in FIG. 2, the adhered layer is the hydrous composition contained in the same coated product, and in the embodiment shown in FIG. 3, the adhered layer is the hydrous composition contained in another coated product. In FIGS. 2 and 3, bags are illustrated as examples, but the form of the bonded body is not limited to a bag.

The present invention includes a packaging material comprising the bonded body. Since the packaging material of the present invention is formed of the bonded body described above, the packaging material can have sufficient adhesive strength even in a low-humidity environment, and is also superior in gas barrier property and biodegradability. The shape of the packaging material of the present invention is not particularly limited, but a two-side-sealed bag (see FIG. 2), a three-side-sealed bag (see FIG. 3), a flat pouch, a standing pouch, a gusset pouch, a twin pouch, or a spout pouch is preferable.

In one embodiment of the present invention, in the packaging material of the present invention, the area of being thermally bonded to the adhered layer is preferably 1 to 90%, and more preferably 5 to 40% in the total area of the hydrous composition of the coated product or the multilayer structure. When the area is in the above range, it is easy to secure the volume as a packaging material while maintaining the adhesive strength.

EXAMPLES

The present invention is described in detail by way of Examples, but the present invention is not limited to these embodiments.

<Test Method>

(1) Measurement of Oxygen Permeability

The sheets obtained in Examples and Comparative Examples were each stored at 23° C. and 50% RH for two weeks to adjust the humidity, and then mounted to an oxygen permeation analyzer, and the oxygen permeability was measured. The measurement conditions are as follows.

Instrument: "MOCON OX-TRAN2/20" manufactured by Modern Controls, Inc.
Temperature: 23° C.
Humidity on oxygen supply side and carrier gas side: 50% RH
Oxygen pressure: 1.0 atm
Carrier gas pressure: 1.0 atm (2) Measurement of Heat Seal Strength The sheets obtained in Examples and Comparative Examples were stored at 20° C. and 30% RH for two weeks to adjust the humidity. A strip-shaped sheet cut into 15 mm×300 mm was folded in two in the longitudinal direction. The portions having a length of 30 mm extending from the fold (area: 15 mm×30 mm) were heat-sealed under the conditions, namely, a graduation pressure of 0.2 MPa, a temperature of 100° C., and a time period of 2 seconds. The heat seal strength was measured by peeling the sealed portion with a tensile tester.

Heat sealing machine: "YSS Heat Sealer" manufactured by Yasuda Seiki Seisakusho Ltd., sealer area: 20 mm×300 mm
Tensile tester: "INSTRON3367" manufactured by Instron Corporation, load cell: 100 N (3) Measurement of Degree of Saponification of Polyvinyl Alcohol (B)

In accordance with JIS K 6726 (Testing Methods for Polyvinyl Alcohol), dissolution titration of polyvinyl alcohol in Examples and Comparative Examples was performed and the degree of saponification was calculated.

(4) Measurement of Viscosity of Polyvinyl Alcohol (B)

In accordance with JIS Z 8803 (falling ball viscometer) and JIS K 6726 (testing methods for polyvinyl alcohol), a 4% aqueous solution of each of the polyvinyl alcohols in Examples and Comparative Examples was prepared and its viscosity at 20° C. was measured using a Hoppler viscometer and was taken as the viscosity (20° C.) in a 4% aqueous solution of the polyvinyl alcohol (B).

(5) Measurement of Dynamic Viscoelasticity

The sheets obtained in Examples and Comparative Examples were stored at 23° C. and 50% RH for two weeks to adjust the humidity, and the sheets were then cut into small pieces of 5 mm×30 mm. After the sample was placed in a dynamic viscoelasticity analyzer ("RHEOGEL-E4000", manufactured by UBM Co., Ltd.), petrolatum was applied to both surfaces in order to prevent volatilization of water due to temperature increase. While the temperature was raised at a rate of 3° C./min in a range of 20° C. to 150° C., the sample was pulled with a sine wave of 11 Hz to measure dynamic viscoelasticity. In the obtained tan δ curve (the horizontal axis represents temperature (° C.) and the vertical axis represents tan δ), the peak temperature of tan δ was recorded. When there were two or more tan δ peaks, the peak present on the highest temperature side was taken as the tan δ peak temperature.

(5) Materials Used

<Modified Starch (A)>
- (A-1): ECOFILM (registered trademark); corn starch modified with propylene oxide, amylose content=70% by mass, available from Ingredion Inc.
- (A-2): National 1658 (registered trademark); corn starch modified with propylene oxide, amylose content=20% by mass, available from Ingredion Inc.

<Polyvinyl Alcohol (B)>
- (B-1): Kuraray Poval (registered trademark) 3-80: polyvinyl alcohol resin, degree of saponification=79.8 mol %, viscosity=3 mPa·s (20° C., 4% aqueous solution), available from Kuraray Co., Ltd.
- (B-2): Kuraray Poval (registered trademark) 5-88: polyvinyl alcohol resin, degree of saponification=88.2 mol %, viscosity=5 mPa·s (20° C., 4% aqueous solution), available from Kuraray Co., Ltd.
- (B-3): Kuraray Poval (registered trademark) 7-92: polyvinyl alcohol resin, degree of saponification=91.5 mol %, viscosity=7 mPa·s (20° C., 4% aqueous solution), available from Kuraray Co., Ltd.
- (B-4): Kuraray Poval (registered trademark) 17-94: polyvinyl alcohol resin, degree of saponification=93.8 mol %, viscosity=17 mPa·s (20° C., 4% aqueous solution), available from Kuraray Co., Ltd.
- (B-5): Kuraray Poval (registered trademark) 27-96: polyvinyl alcohol resin, degree of saponification=96.0 mol %, viscosity=27 mPa·s (20° C., 4% aqueous solution), available from Kuraray Co., Ltd.
- (B-6): Kuraray Poval (registered trademark) 5-98: polyvinyl alcohol resin, degree of saponification=98.8 mol %, viscosity=5 mPa·s (20° C., 4% aqueous solution), available from Kuraray Co., Ltd.
- (B-7): ELVANOL (registered trademark) 71-30; polyvinyl alcohol resin, degree of saponification=99.5 mol %, viscosity=30 mPa·s (20° C., 4% aqueous solution), available from Kuraray Co., Ltd.
- (B-8): Kuraray Poval (registered trademark) 25-100: polyvinyl alcohol resin, degree of saponification=99.9 mol %, viscosity=25 mPa·s (20° C., 4% aqueous solution), available from Kuraray Co., Ltd.
- (B-9): Kuraray Poval (registered trademark) L-8: polyvinyl alcohol resin, degree of saponification=71.2 mol %, viscosity=5 mPa·s (20° C., 4% aqueous solution), available from Kuraray Co., Ltd.
- (B-10): Kuraray Poval (registered trademark) 22-88: polyvinyl alcohol resin, degree of saponification=88.0 mol %, viscosity=22 mPa·s (20° C., 4% aqueous solution), available from Kuraray Co., Ltd.
- (B-11): Kuraray Poval (registered trademark) 5-88: polyvinyl alcohol resin, degree of saponification=88.0 mol %, viscosity=5 mPa·s (20° C., 4% aqueous solution), available from Kuraray Co., Ltd.

<Clay (C)>
- (C-1): CLOISITE (registered trademark) 20A: natural montmorillonite organized (modified) with dimethyldi (hydrogenated tallow) quaternary ammonium chloride, available from Southern Clay Industries.

<Polyoxyalkylene (D)>
- (D-1): ALKOX (trademark) L-11: polyethylene oxide resin, weight-average molecular weight=100,000, available from Meisei Chemical Works, Ltd.

<Polyol Plasticizer (E)>
- (E-1): Sorbitol SP; sorbitol, available from B Food Science Co., Ltd.

Example 1

Figure 4:
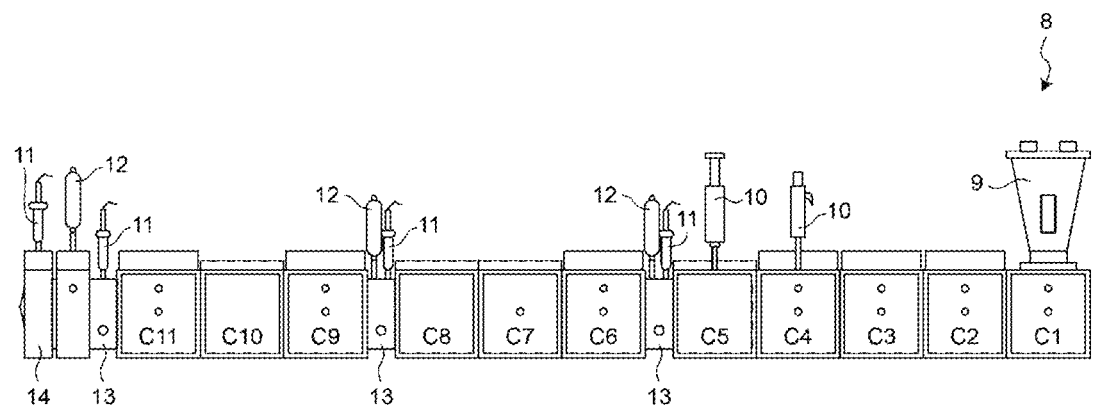
FIG. 4 is a schematic view of a twin screw extruder used in Examples.
Figure 5:
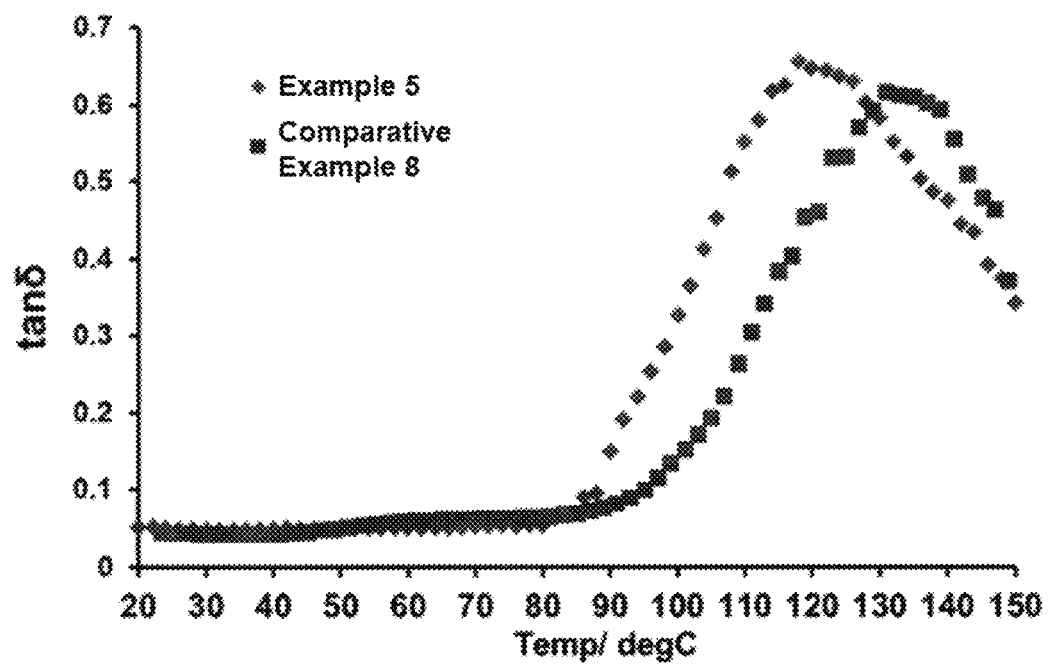
FIG. 5 is a tan δ curves obtained by dynamic viscoelasticity measurement in Example 5 and Comparative Example 8.

As raw materials, 90 parts by mass of modified starch (A-1) and 10 parts by mass of polyvinyl alcohol (B-1) were mixed in a tumbler mixer for 2 hours, and the resulting mixture was fed to a twin screw extruder to which a liquid pump was connected. FIG. 4 shows a schematic view of the twin screw extruder used in Example 1, and the screw diameter, the L/D ratio, the rotation speed, the operation mode, and the temperature profile (Table 1) of the extruder are shown below.

TABLE 1

| Temperature profile [° C.]: | | | | | | | | | | | | |
|---|---|---|---|---|---|---|---|---|---|---|---|---|
| C1 | C2 | C3 | C4 | C5 | C6 | C7 | C8 | C9 | C10 | C11 | Adapter | Die |
| 40 | 70 | 80 | 90 | 120 | 140 | 130 | 120 | 120 | 100 | 100 | 100 | 100 |

Screw diameter: 27 mm

L/D ratio: 48

Screw rotation speed: 500 rpm

Operation mode: co-rotation (engaging self-wiping) mode

Specifically, the resulting mixture was fed at a rate of 3.5 kg/hour into the barrel through the hopper at C1 via the weight feeder of the twin screw extruder. Water was injected at a flow rate of 26 g/min into the barrel through the liquid pump (10 in FIG. 4) at C4. The temperature ranges of C5 to C9 are cooking ranges, and complete gelatinization was completed within these ranges. The resin composition extruded through the die was wound at a winding speed so as to achieve a thickness of 120 μm after cooling and drying, and thus a film having a thickness of 120 μm was obtained. The water content of the resin composition (film) was 11%. The water content was determined by measuring at 130° C.

for 60 minutes using a heat-drying moisture meter. At the time of measuring the water content, the resin composition (film) was pulverized to a maximum particle diameter of 1 mm or less with a Wonder Blender WB-1 (manufactured by Osaka Chemical Co., Ltd.) and measured.

Examples 2 to 14 and Comparative Examples 1 to 9

Resin compositions (sheets) were obtained in the same manner as in Example 1 except that the types and the addition amounts of the modified starch (A), the polyvinyl alcohol (B), and other substances were adjusted as shown in Table 2. In Example 10, a mixture of 81 parts by mass of modified starch (A-1) and 9 parts by mass of modified starch (A-2) was used as the modified starch (A), and in Example 11, a mixture of 54 parts by mass of modified starch (A-1) and 36 parts by mass of modified starch (A-2) was used. In the examples other than Examples 10 and 11, modified starch (A-1) was used as the modified starch (A) in the same manner as in Example 1.

Using the resin compositions (sheets) obtained in Examples 1 to 14 and Comparative Examples 1 to 9, the peak temperature of tan δ in dynamic viscoelasticity, the oxygen permeability, and the heat seal strength were measured. The results are shown in Table 2.

As shown in Table 2, the resin compositions (sheets) obtained in Examples 1 to 14 were confirmed to be low in oxygen permeability and high in heat seal strength. In contrast, the resin compositions (sheets) obtained in Comparative Examples 1 to 9 were confirmed to be significantly inferior in both or any one of oxygen permeability and heat seal strength as compared with Examples.

Thus, it was found that the resin composition of the present invention is superior in heat sealability and gas barrier property.

DESCRIPTION OF REFERENCE SIGNS 1a, 1b: Bonded body
2, 2a, 2b, 2c: Coated product
3, 3a, 3b, 3c: Hydrous composition
4, 4a, 4b, 4c: Paper or film
5a, 5c: Adhered layer
6a, 6b: Thermocompression bonding portion (thermally bonded portion)
8: Twin screw extruder
9: Hopper
10: Liquid addition nozzle
11: Resin temperature meter
12: Resin pressure meter
13: Adapter
14: Die

| | Modified starch (A) | | Polyvinyl alcohol (B) | | | | Other substances | | Peak temperature (°C.) of tan δ in dynamic visco-elasticity measurement | Oxygen permeability (mL · [m² · atm · 24 hr]) 23° C. 50% RH | Heat seal strength (N/ 15 mm) 20° C. 30% RH |
|---|---|---|---|---|---|---|---|---|---|---|---|
| | Amylose content (mass %) | addition amount (parts by mass) | Type | Degree of saponification (mol %) | Viscosity (mPa · s) | addition amount (parts by mass) | Type | addition amount (parts by mass) | | | |
| Example 1 | 70 | 90 | (B-1) | 79.8 | 3 | 10 | — | — | 100 | 3.2 | 6.2 |
| Example 2 | 70 | 90 | (B-2) | 88.2 | 5 | 10 | — | — | 110 | 2.7 | 5.9 |
| Example 3 | 70 | 90 | (B-3) | 91.5 | 7 | 10 | — | — | 112 | 2.5 | 5.8 |
| Example 4 | 70 | 90 | (B-4) | 93.8 | 17 | 10 | — | — | 115 | 2.3 | 5.9 |
| Example 5 | 70 | 90 | (B-5) | 96.0 | 27 | 10 | — | — | 117 | 2.5 | 6.4 |
| Example 6 | 70 | 90 | (B-6) | 98.8 | 5 | 10 | — | — | 118 | 1.9 | 6.2 |
| Example 7 | 70 | 98 | (B-5) | 96.0 | 27 | 2 | — | — | 124 | 3.8 | 4.5 |
| Example 8 | 70 | 70 | (B-5) | 96.0 | 27 | 30 | — | — | 84 | 0.8 | 6.3 |
| Example 9 | 70 | 50 | (B-5) | 96.0 | 27 | 50 | — | — | 70 | 0.5 | 5.6 |
| Example 10 | 65 | 90 | (B-5) | 96.0 | 27 | 10 | — | — | 118 | 1.9 | 6.4 |
| Example 11 | 50 | 90 | (B-5) | 96.0 | 27 | 10 | — | — | 117 | 1.8 | 5.8 |
| Example 12 | 70 | 89.9 | (B-5) | 96.0 | 27 | 10 | (C-1) | 0.1 | 117 | 2.5 | 6.2 |
| Example 13 | 70 | 87 | (B-5) | 96.0 | 27 | 10 | (D-1) | 3 | 118 | 2.6 | 6.2 |
| Example 14 | 70 | 87 | (B-5) | 96.0 | 27 | 10 | (E-1) | 3 | 110 | 3.0 | 5.8 |
| Comparative Example 1 | 70 | 90 | (B-7) | 99.5 | 30 | 10 | — | — | 130 | 2.6 | 0.2 |
| Comparative Example 2 | 70 | 90 | (B-8) | 99.9 | 25 | 10 | — | — | 130 | 2.2 | 0.1 |
| Comparative Example 3 | 70 | 90 | (B-9) | 71.2 | 5 | 10 | — | — | 96 | 13 | 5.0 |
| Comparative Example 4 | 70 | 100 | — | — | — | 0 | — | — | 133 | 13 | 0.3 |
| Comparative Example 5 | 70 | 99 | (B-5) | 96.0 | 27 | 1 | — | — | 130 | 10 | 0.4 |
| Comparative Example 6 | 70 | 30 | (B-5) | 96.0 | 27 | 70 | — | — | 40 | 0.4 | 0.5 |
| Comparative Example 7 | 58 | 88 | (B-7) | 99.5 | 30 | 10 | (C-1) | 2 | 130 | 1.8 | 0.8 |
| Comparative Example 8 | 65 | 88 | (B-10) | 88.0 | 22 | 10 | (C-1) | 2 | 130 | 2.2 | 0.7 |
| Comparative Example 9 | 65 | 88 | (B-11) | 88.0 | 5 | 10 | (C-1) | 2 | 130 | 2.5 | 0.8 |

The invention claimed is:

1. A resin composition comprising 40 to 98 parts by mass of a modified starch (A), 2 to 60 parts by mass of a polyvinyl alcohol (B) having a degree of saponification of 75.0 mol % or more, and optionally a clay (C),
   wherein the total content of the (A), (B) and (C) is 100 parts by mass, and the peak temperature of tan δ in measurement of dynamic viscoelasticity in a range of 20° C. to 150° C. is 128° C. or lower.

2. The resin composition according to claim 1, wherein the total content of the modified starch (A), the polyvinyl alcohol (B), and the clay (C) is 80 mass % or more with respect to the mass of the resin composition.

3. The resin composition according to claim 1, wherein the modified starch (A) has an average amylose content of 45% by mass or more.

4. The resin composition according to claim 1, wherein the polyvinyl alcohol (B) has a degree of saponification of 75.0 to 98.9 mol %.

5. The resin composition according to claim 1, wherein the content of the clay (C) is 0 parts by mass or more and less than 2 parts by mass.

6. The resin composition according to claim 1, wherein the modified starch (A) is at least one selected from the group consisting of an etherified starch, an esterified starch, a cationized starch, and a crosslinked starch.

7. The resin composition according to claim 1, wherein the modified starch (A) is at least one selected from the group consisting of an etherified starch having a hydroxyalkyl group having 2 to 6 carbon atoms and an esterified starch having a structural unit derived from a dicarboxylic anhydride.

8. The resin composition according to claim 1, wherein a 4% aqueous solution of the polyvinyl alcohol (B) has a viscosity at 20° C. measured in accordance with JIS Z 8803 of 1 to 50 mPa·s.

9. A hydrous composition comprising the resin composition according to claim 1,
   wherein the hydrous composition has a water content of 1 to 50% by mass.

10. A coated product in which a paper or a film is coated with the hydrous composition according to claim 9.

11. A multilayer structure comprising the coated product according to claim 10 and one or more layers (X).

12. A bonded body in which the hydrous composition of the coated product according to claim 10 and an adhered layer are thermally bonded together,
   wherein the adhered layer is a layer selected from the group consisting of the hydrous composition, the paper, the film, and the layer (X) contained in the coated product, the multilayer structure, another coated product, or another multilayer structure, or a layer contained in an adhered body other than these.

13. The bonded body according to claim 12, wherein the adhered layer is the hydrous composition contained in the coated product, the multilayer structure, another coated product, or another multilayer structure.

14. A packaging material comprising the bonded body according to claim 12.

15. The packaging material according to claim 14, which is a two-side-sealed bag, a three-side-sealed bag, a flat pouch, a standing pouch, a gusset pouch, a twin pouch, or a spout pouch.

16. A method for producing the coated product according to claim 10, comprising a step of coating a film or a paper conveyed by a winding device with the hydrous composition by using an extruder.

* * * * *